United States Patent

[11] 3,545,493

| | | |
|---|---|---|
| [72] | Inventor | Jerry H. Freeman<br>Mt. Prospect, Illinois |
| [21] | Appl. No. | 780,542 |
| [22] | Filed | Dec. 2, 1968 |
| [45] | Patented | Dec. 8, 1970 |
| [73] | Assignee | Phone-Ducs, Inc.<br>Chicago, Illinois<br>a corporation of Illinois |

[54] CONDUIT SECTIONS
20 Claims, 10 Drawing Figs.

[52] U.S. Cl. ................................................ 138/115
[51] Int. Cl. ................................................ F16l 9/18
[50] Field of Search ................................... 138/111–117

[56] References Cited
UNITED STATES PATENTS

| | | | |
|---|---|---|---|
| 1,785,403 | 12/1930 | Babb | 138/115 |
| 1,968,447 | 7/1934 | Hardesty | 138/115X |
| 2,971,538 | 2/1961 | Brumbach | 138/111 |

*Primary Examiner*—Louis K. Rimrodt
*Attorney*—Wallenstein, Spangenberg, Hattis and Strampel

ABSTRACT: Multipassage conduit sections that are connected together and buried beneath the earth's surface to provide extended sealed support passages for transmission lines such as telephone and telegraph cables. The conduit sections are of molded high impact plastic such as linear polyethylene which can be formed in a tapered mold to fashion the inner surface of each passage diverging outwardly from the center of the section to both ends thereof. Hook means are provided at each end of a section to facilitate connecting one section to the next.

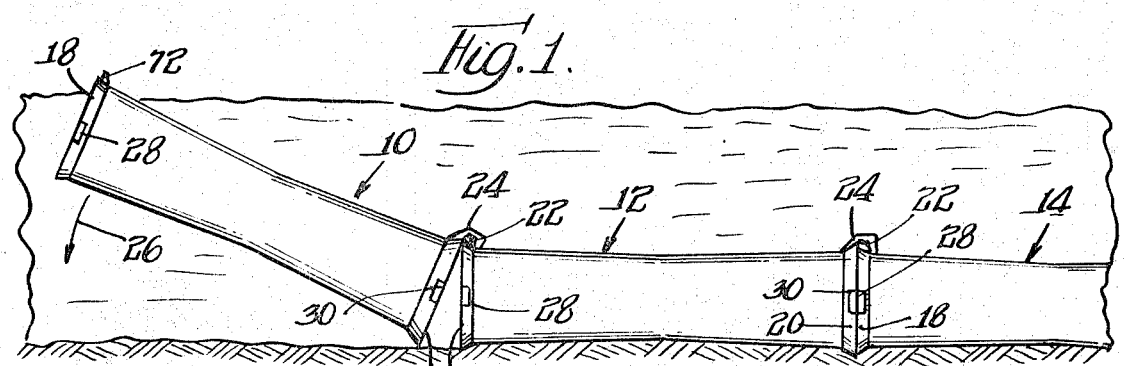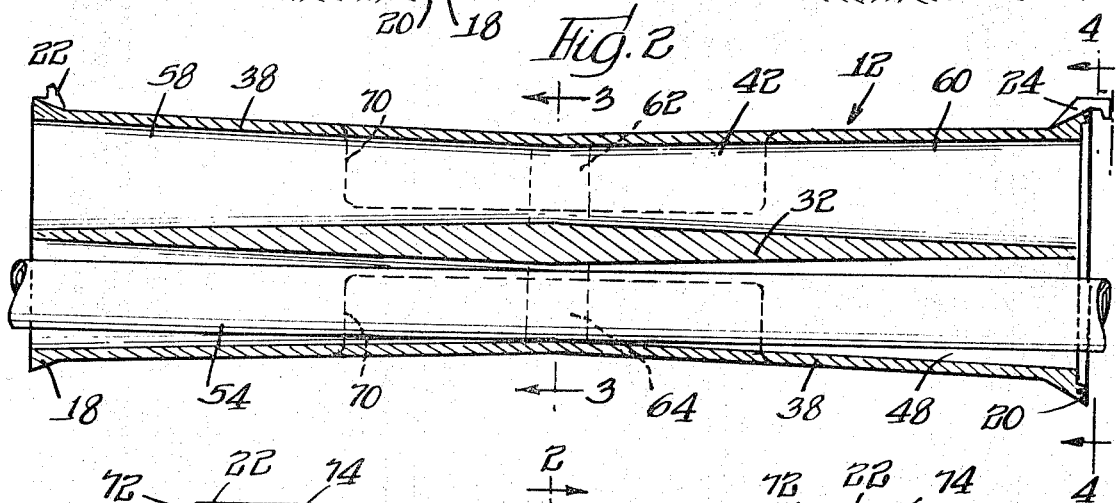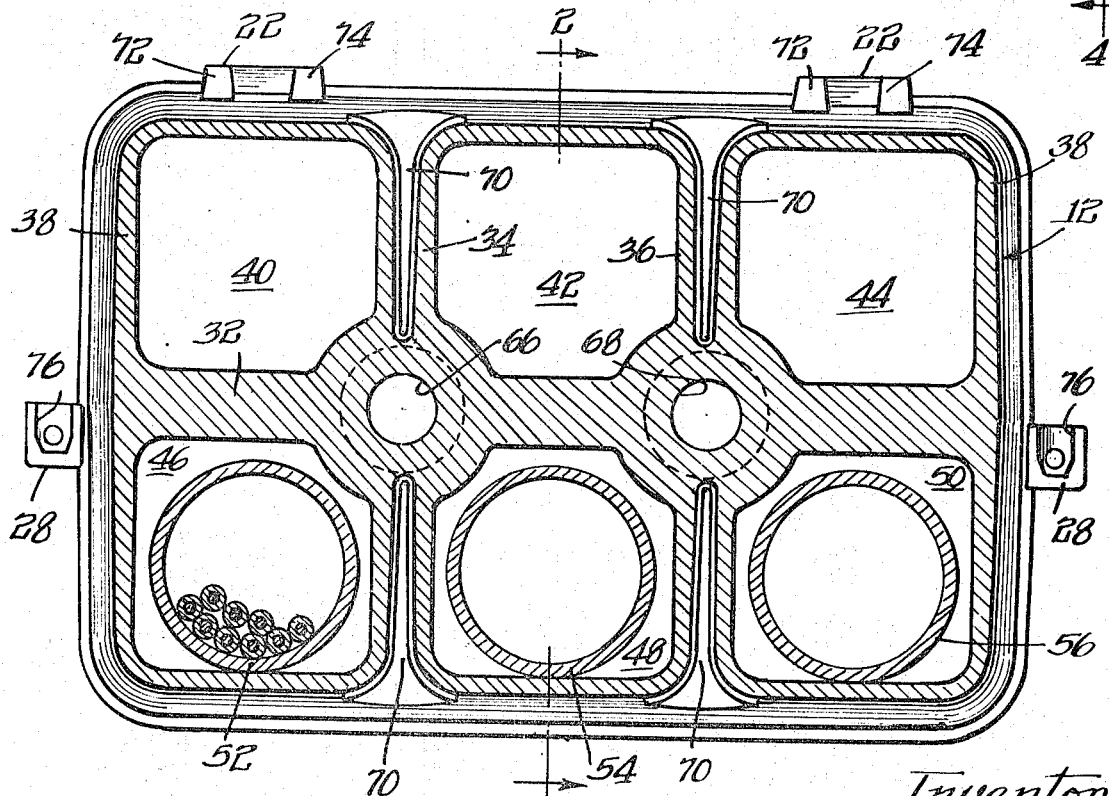

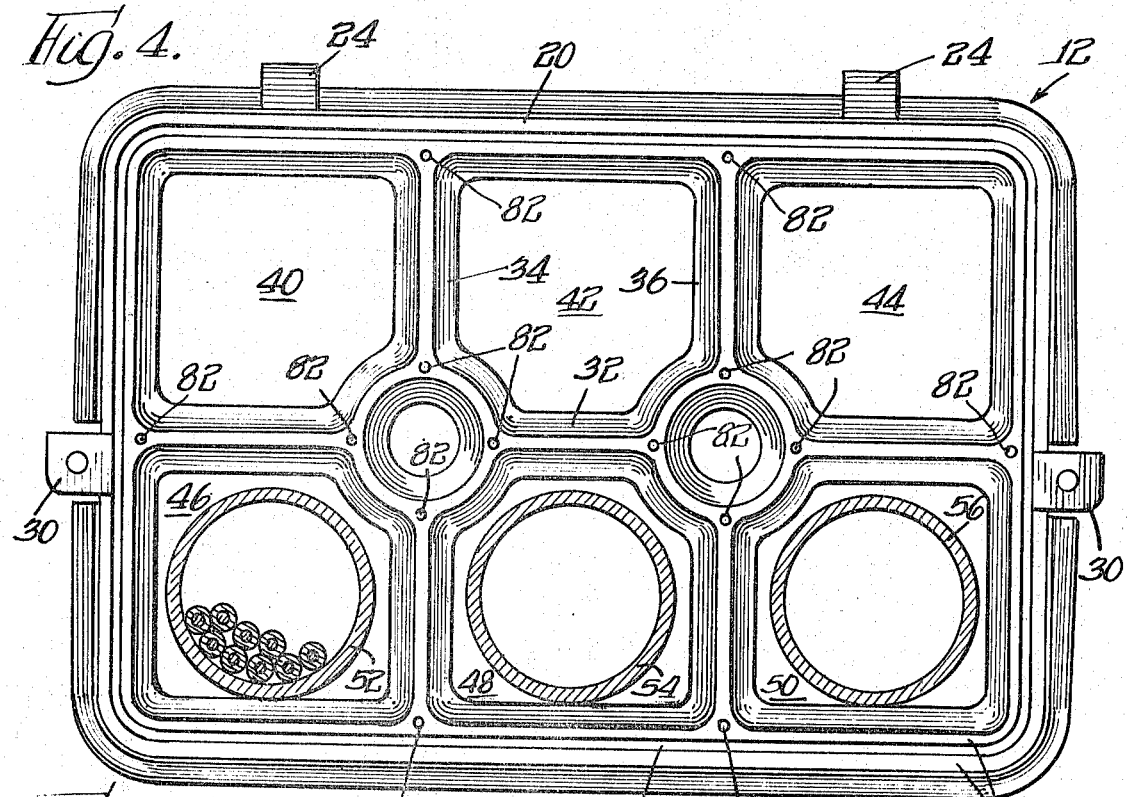

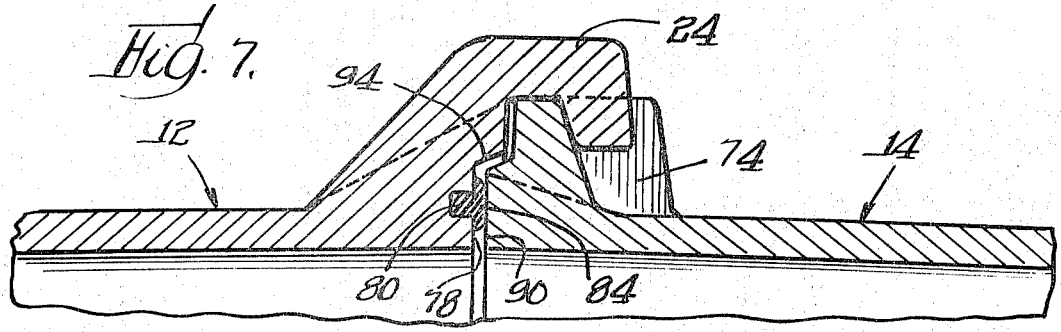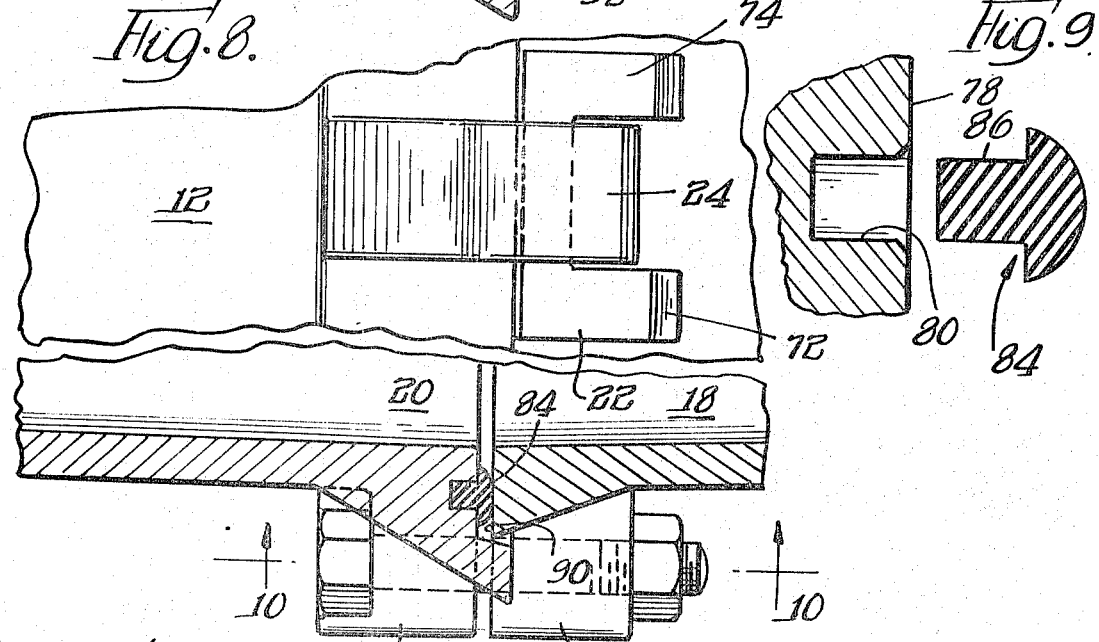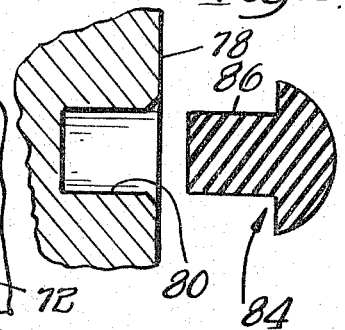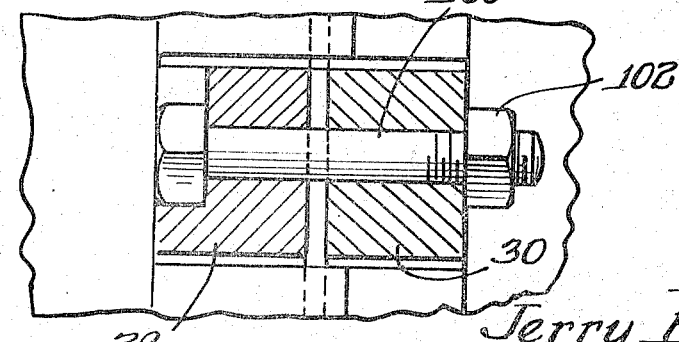

CONDUIT SECTIONS

This invention relates generally to conduit sections, and more particularly to multipassage conduit sections that are connected together and buried beneath the earth's surface to provide a protective housing about a plurality of cables extending through the conduit sections.

Underground burial of telephone and telegraph cables, as well as other kinds of cables, is a well-known expedient used to provide a path for such cables between distant stations. A trench is formed in the ground to follow a path between the distant stations and one or more cables are laid in the trench and covered. This operation may be a series of steps such as digging short lengths of trench one after the other, the next length of trench being excavated after the preceding length has received its cable or cables and said preceding length is filled or covered with earth.

Cables buried in this manner run the risk of being damaged by sharp objects, corrosion or by subsequent digging over the cable and, therefore, cables for telephone or telegraph transmission are generally inserted into protective conduit sections that are placed one against the other and extend the entire length of the trench. Conduits of this kind are formed, for example, of concrete or clay sections having substantially uniform cross section from one end to the other. After the conduit sections are in place in the trench, the cables are pulled through the desired passages of the conduit sections in a conventional manner. Since the conduit sections of the prior art are of uniform cross sections the cables passing through the passages of the conduit engage or come in contact with the full length of at least the bottom surface of the passages to increase the frictional drag on the cables while the cables are being pulled through the passages. Also, the connecting together of prior art conduit sections may be time consuming or may require special tools or apparatus.

The conduit sections constructed in accordance with this invention are provided with a male end and a female end and suitable hook means located adjacent each end such that similar conduit section in juxtaposition are hooked together with one conduit section placed at an angle relative to the other conduit section with the hook means engaged and then said one conduit section is moved through the angle pivoting about the hook means to guide the male end of one conduit section into the female end of the other. This feature facilitates connecting conduits section together to form a housing of finite length for cables. The conduit sections of this invention are also provided with guide surfaces which are located in the passages extending through each conduit section. The guide surfaces reduce friction when cables are pulled through the passages and also serve to provide bearing support means within the passages to support the majority of the weight of the cables so that little weight is supported at the male-female connections of the conduit sections.

Briefly, the conduit sections of this invention are preferably made of high impact plastic such as linear polyethylene and each section, at least at the ends thereof, is substantially the same as corresponding ends of other conduit sections providing male and female ends on each section so that sections of a given size may be interchanged in position when connecting them together to form housing of finite length of for cables. Each conduit section may have tapered surrounding walls that extend from one end of the section to the other end thereof, the walls being tapered to facilitate parting of the mold which is used to form the section and to facilitate removal of the section from the mold. The passages extending through each conduit section are formed by tapered plugs which are on the end parts of the mold and are drawn outwardly of the formed section in opposite directions. The tapered plugs form passages consisting of two contiguous lengths joined at the center of the passage and diverging therefrom in opposite directions toward the ends of the section. Therefore, the passages through a conduit section formed according to this invention have a minimum opening dimension at the juncture of the lengths of a given passage and a gradually increasing opening dimension in the direction of the ends of the section.

The many objects, features and advantages of this invention will become apparent from the following detailed description when taken in conjunction with the accompanying drawings wherein like reference numerals throughout the various views of the drawings are intended to designate similar elements or components.

FIG. 1 illustrates several conduit sections constructed according to this invention and connected together when positioned at the bottom of a trench;

FIG. 2 is an elevational sectional view of one of the conduit sections of FIG. 1;

FIG. 3 is a cross-sectional view taken along line 3—3 of FIG. 2;

FIG. 4 is an end view of the female end of the conduit section of FIG. 2;

FIG. 5 is a plan view of a gasket that fits on the female end shown in FIG. 4;

FIG. 6 is a sectional view taken along line 6—6 of FIG. 5;

FIG. 7 is a side elevational sectional view with parts broken away to illustrate the mating ends and gasket seal therebetween of juxtaposition conduit sections;

FIG. 8 is a top sectional view with parts broken away illustrating the hook means for fastening the conduit sections together and the tab for receiving bolts to lock the conduit sections together;

FIG. 9 is a partial sectional view showing a groove which is formed in the flat face of the female end of FIG. 4 and a cross section of an elongated raised portion of the gasket of FIG. 5 in alinement with the groove; and FIG. 10 is a sectional view taken along lines 10—10 passing through the bolt receiving tabs of FIG. 8.

Referring now to FIG. 1 a plurality of conduit sections 10, 12 and 14 are positioned in a trench 16 which is excavated in the earth's surface to a depth desirable for burial of cables such as telephone or telegraph cables. Each conduit section is substantially the same in configuration as the other conduit sections preferably being made of high impact plastic such as linear polyethylene which is formed by injecting molding. A male end 18 and a female end 20 are formed by on each conduit section 10, 12 and 14 such that one end of a conduit section fits into a mating end of another conduit section when they are connected together as seen in FIG. 1. To facilitate connecting the conduit sections 10, 12 and 14 one to the other, each conduit section is provided with hook means as for example a raised boss 22 located at the male end 18 and a fingerlike hook 24 located at the female end 20. With the conduit section 12 in place, the conduit section 10 is positioned in an angled downwardly attitude toward the conduit section 12 such that the hook 24 of section 10 engages the boss 22 of the section 12 and then the male end 18 of section 10 lowered through an angle indicated by reference numeral 26. This will cause the conduit section 10 to pivot about the connection of the boss 22 and the hook 24 and when the conduit section 10 is positioned in the bottom of the trench 16 the male end 18 of section 12 will be engaged with the female end 20 of section 10 and the sections will be held together. Tab means 28 and 30 are formed at the male end 18 and female end 20 respectively of each conduit section 10, 12 and 14, and the tab means 28 of one section is alined with the tab means 30 of another section when the conduit section are held together by their corresponding boss 22 and fingerlike hook 24. A fastening device such as a bolt passes through the alined tabs and a nut is provided to lock the conduit sections together. A gasket or other seal means may be provided between the mating ends of juxtaposed conduits sections to provide a watertight seal about the passages through the conduit sections.

The configuration of the passages through the conduit sections 10, 12 and 14 are best seen in FIGS. 2 and 3 which illustrate a lengthwise sectional view and a cross-sectional view respectively of the conduit section 12 which is typical of all conduit sections. The conduit section 12 includes a horizontal web member 32 and a pair of vertical web members 34 and 36 which, together with the surrounding walls 38, define a plurality of passages 40, 42, 44, 46, 48 and 50. Cables 52, 54 and 56 are shown positioned in passages 46, 48 and 50 respectively. The cables 52, 54 and 56 may be of the multiconductor type commonly used for telephone or telegraph communications.

Each passage through the conduit section 12 is divided into oppositely directed lengths which are contiguous at or near the center of the passage and diverging therefrom toward the ends of the conduit section such that each passage has a minimum transverse dimension at the junction of the oppositely directed diverging lengths. That is, the passage 42 is formed of a length 58 and a length 60 each of which diverge from the center of the passage 42 toward their respective ends 18 and 20 so that a minimum transverse dimension guide surface 62 is formed at the junction of the lengths 58 and 60. A guide surface 64 is formed in the passage 48 in the same manner as are guide surface in each of the other passages 40, 44, 46 and 50. The axial extent of the guide surfaces are but a fractional part of the total axial extent of the passages from end to end as indicated by the dotted lines at the center of the conduit section 12 of FIG. 2. Therefore, after the conduit sections are connected together and a cable is being drawn through the successive corresponding passages, the majority of the weight of the cable will be supported by the guide surface in each passage thereby reducing the friction between the passage and the cable to make it easier to pull the cable through the passage. Also, after the cables are drawn through the passages little or no cable weight is supported at the end of the passages particularly if the cables are stiff or stretched so as not to sag between the guide surfaces of successive passages.

To draw cables through the passages of the connected conduit sections from one end of the other it is customary to first push a somewhat flexible metal tape through the successive passages until the tape extends beyond the last conduit section whereat a cable is connected to the tape and the tape is pulled back through the passages thereby pulling the cable with it. The tapered passages through each conduit section also facilitates in this operation since the metal tape, when pushed through successive passages, will ride or be supported on the guide surfaces of the successive passages and will not hang up or get caught at the interface of the mating male and female end of the sections.

The intersections of the horizontal web member 32 and the vertical members 34 and 36 are somewhat circular in cross section and have tapered passages 66 and 68 extending therethrough for receiving smaller cables. The passages 66 and 68 also have guide surfaces which are formed and function in the same manner as the guide surfaces 62 and 64.

Each of the web members 32, 34 and 36 is tapered such that the cross section form the ends of the conduit section 12 increase toward the center thereof, as best seen in FIG. 2 with regard to the horizontal web member 32. The overall transverse dimension of the surrounding walls 38 is tapered decreasingly from the ends of the conduit section 12 toward the center thereof and slight tapers on the side walls to provide a draw angle to facilitate parting of the mold form in a manner well known in the art. The web members 34 and 36 includes recesses 70 which provide means for reducing the amount of material in the vertical web members near the center conduit section thereby decreasing the weight of the section. The tabs 28 and 30 are formed below the center parting line of the two exterior mold form portions used in manufacturing the conduit sections. Preferably, each boss 22 includes a pair of sidewalls 72 and 74 to receive hooks 24 therebetween and prevent lateral movement of the conduit sections while they are being connected together thereby maintaining the male end of one section in alinement with the female end of another section while they are being connected together. Tabs 28 may have notches 76 formed therein to receive and hold the head of a bolt or a nut when sections are locked together.

FIG. 4 is an end view of the female end 20 of the conduit 12 and illustrates a flat face 78 which circumscribes the passages 40, 42, 44, 46, 48 and 50. The flat face 78 terminates in a plane substantially perpendicular to the access of the passages through the conduit section 12 and the web members 32, 34 and 36 also terminate in the same plane. An elongated groove 80 is formed in the flat face 78 and a plurality of holes 82 are formed in the ends of the web members 32, 34 and 36 and are of the same depth as the groove 80. The male end of the conduit section 12 is provided with a similar flat face and the other end of the web member 32, 34 and 36 terminates in the same plane therewith to provide a matching face surface for the female end of the next connected conduit section. A conformably shaped gasket 84, seen in FIGS. 5 and 6, is provided with an elongated raised portion 86 which fits into the groove 80 of the female end 20 and is also provided with a plurality of discrete raised portions 88 which fit into the holes 82 at the female end 20. Therefore, the gasket 84 is held in position while the conduit sections are connected together. This is best seen in FIG. 9 which illustrates the cooperation of the elongated raised portion 86 of gasket 84 with the groove 80 in the flat face 78. The gasket 84 provides a seal about each passage at the mating ends of conduit sections when the sections are locked in position.

FIGS. 7 and 8 clearly illustrate the construction of the male end 18 of one conduit section which is engaged with the female end 20 of another conduit section and with the gasket 84 located between the connected ends. The conduit section 14 has a flat face 90 formed at the male end thereof to engage the gasket 84 located within the female end of the conduit section 12.

The female end 20 of each of the conduit sections has a bell end which is formed by a hood 92 which extends radially outwardly of the flat face 78 and extends axially beyond the flat face 78 to receive and circumscribe the male end 18 of the corresponding adjacent conduit section. The hood 92 has a tapered inner wall 94 which serves to alien and guide the conduit sections together when one conduit section is pivoted about the connection of the boss 22 and hook 24 and the flat face of the conduit sections are brought together.

FIG. 10 clearly illustrates the tab means 28 in alinement with the tab means 30 and a bolt 100 passing through the tab means and receiving a nut 102 to lock the conduit sections together.

Accordingly, the present invention provides quick connect conduit sections for burial beneath the earth's surface, and the passages through each conduit section have a guide surface.

I claim:

1. A conduit section to similar conduit sections to provide a conduit of desired length for housing cables, therein, comprising: a body having first and second ends and surrounding walls extending between said first and second ends; at least one passage through said body extending from said first end to said second end, said at least one passage having a first length diverging from the center of said body in one direction toward said first end and a second length diverging from said center in the opposite direction toward said second end; and a guide surface formed in said passage at the juncture of said first and second lengths and extending axially of said passage a small fractional distance of the total distance between said first and second ends, said guide surface forming the principal support for the cable passing therethrough.

2. A conduit section according to claim 1 further including; fastening means formed on said body at said first and second ends whereby, when said conduit section is placed adjacent a similar conduit section, the sections are held together by said fastening means.

3. A conduit section according to claim 2 wherein said fastening means includes a protruding boss formed adjacent said first end on one of said surrounding walls and a hook formed adjacent said second end on said one of said surrounding walls whereby the hook on one conduit section will engage the boss on another similar conduit section to hold the sections together.

4. A conduit section according to claim 3 further including first and second tab means positioned on said body adjacent said first and seconds ends respectively, said first and second tab means arranged for alignment with corresponding first and second tab means on juxtaposed similar conduit sections when the conduit sections are held in position by said fastening means, said tab means receiving locking means to lock the conduit sections together.

5. A conduit section according to claim 3 further including a hood formed on said surrounding walls at said second end extending radially outwardly from said second end and extending axially beyond said second end to engage and circumscribe a corresponding first end of an adjacent similar conduit section.

6. A conduit section according to claim 1 wherein said body includes a plurality of web members, some of said web members arranged substantially at right angles to at least one web member and intersecting therewith and all of said web members extending substantially the entire length of said body from said first end to said second end to divide said body into a plurality of passages, each of said passages having a first length diverging from the center of said body in one direction toward said first end and a second length diverging from said center in the opposite direction toward said second end, and a guide surface formed in each of said passages at the juncture of said first and second lengths of said respective passages and extending axially of said passages a small fractional distance of the total distance between said first and second ends.

7. A conduit section according to claim 6 wherein the intersection of said web members form a subbody and a cylindrical passage extending through said subbody said cylindrical passage having a first length diverging from the center of said subbody in one direction toward said first end and a second length diverging from said center in the opposite direction toward said second end; and a guide surface formed in said cylindrical passage at the juncture of said first and second length of said cylindrical passage extending axially of the passage a small fractional distance of the total distance between said first and second ends.

8. A conduit section according to claim 7 wherein said first end lies in a first plane and said surrounding walls, web members and subbody terminate at said first end and in said first plane, and said second end lies in a second plane which is substantially parallel to said first plane and said surrounding walls, web members and subbody terminate at said second end in said second plane, and a groove formed in said surrounding walls at said second end and holes formed in said web members and said subbody at said second end, and a gasket having a continuous, elongated raised portion inserted into said groove and discrete raised portion inserted into said holes, said gasket defining a seal about the end of each passage through said body and said subbody when said conduit section is locked in position with a similar conduit section.

9. A conduit section according to claim 8 further including a hood formed on said surrounding walls at said second end extending radially outwardly from said second end and extending axially beyond said second end to engage and circumscribe a corresponding first end of an adjacent similar conduit section.

10. An injection molded conduit section having a male end and a female end and surrounding walls extending between said male and female ends; at least one passage through the conduit section extending from said male end to said female end, said passage having a first length diverging from the center of said passage in one direction toward said male end and a second length diverging from said center in the opposite direction toward said female end; and a guide surface formed in said passage at the juncture of said first and second lengths and extending axially of said passage a small fractional distance of the total distance between said male and female ends.

11. An injection molded conduit section according to claim 10 further including fastening means formed on the conduit section at said male and female ends whereby, when said conduit section is placed adjacent a similar conduit section, the female end of said conduit section is engaged by the corresponding male end of said adjacent conduit section and the sections are held together by said fastening means.

12. An injection molded conduit section according to claim 11 wherein said fastening means includes a protruding boss formed adjacent said male end on one of said surrounding walls and a hook formed adjacent said female end on said one of said surrounding wall whereby, the hook on one conduit section engages the boss on another similar conduit section to hold the sections together.

13 An injection molded conduit section according to claim 12 further including first and second tab means positioned on the conduit section adjacent said male and female ends respectively, said tab means arranged for alinement with corresponding tab means on another adjacent similar conduit sections when held together by said fastening means, said tab means receiving locking means to lock the sections together.

14. An injection molded conduit section according to claim 13 wherein web members are formed within said surrounding walls, some of said web members arranged substantially at right angles to at least one web member and intersecting therewith and all of said web members extending substantially the entire length of said surrounding walls between said male and female ends to divide the conduit section into a plurality of passages, each of said passages having a first length diverging from the center of the passage in one direction toward said male end and a second length diverging from said center in the opposite direction toward said female end, and a guide surface formed in each of said passages at the juncture of said first and second lengths of respective passages and extending axially of said passages a small fractional distance of the total distance between said male and female ends.

15. An injection molded conduit section according to claim 14 further including a cylindrical passage extending through said web members at each intersection thereof, each of said cylindrical passages having a first length diverging from the center of the passage in one direction toward said male end and a second length diverging from said center in the opposite direction toward said female end; and a guide surface formed in each of said cylindrical passage extending axially of the passage a small fractional distance of the total distance between said male and female ends.

16. An injection molded conduit section according to claim 15 wherein said, male end terminates in a first plane with one end of said surrounding walls and said web members terminating in said first plane, and said female end terminates beyond a second plane which is parallel to said first plane and portions of the other end of said surrounding walls extend beyond said second plane with other portions of said surrounding walls and said web members terminating in said second plane, and a groove formed in said other portions of said surrounding walls and holes formed in said web members within said second plane, and a gasket having a continuous elongated raised portion inserted into said groove and discrete raised portion inserted into said holes, said gasket defining a seal about the end of each passage when said conduit section is locked in position with a similar conduit section.

17. A conduit section for connection to similar conduit sections to provide a conduit of desired length for housing cable therein, including: a body having surrounding walls; a male end formed at one end of said body; a female end formed at the opposite end of said body and spaced apart from said male end by said walls, at least one passage through said body extending from said male end to said female end substantially parallel to said wall for receiving a cable thenthrough; first hook means on one of said walls and located adjacent said male end; and second hook means on said one of said walls and located adjacent said female end for receiving a corresponding first hook means of a similar conduit section whereby, two similar conduit sections in juxtaposition are held in abutting relation by said corresponding first hook means and said second hook means when a corresponding male end of said similar conduit section engaging said female end.

18. A conduit section according to claim 17 wherein said first hook means is a protruding boss and said second hook means is a hooklike finger having an upwardly extending portion leading into a downwardly extending portion to engage said protruding boss.

19. A conduit section according to claim 18 further including retaining sidewalls on each side of said boss to confine the hooklike finger on a similar juxtaposition conduit section for limiting lateral movement of the conduit sections while they are being hooked together and to aline the male end of one conduit section with the female end of the other conduit section.

20. A conduit section according to claim 19 further including first and second tab means positioned on said body adjacent said male and said female ends respectively, said first and second tab means arranged for alinement with corresponding first and second tab means on juxtaposed similar conduits section when the conduit sections are held in position by said boss and said hooklike finger, said tab means receiving locking means to lock the conduit sections together.